United States Patent
Inoue et al.

(10) Patent No.: US 7,920,352 B2
(45) Date of Patent: Apr. 5, 2011

(54) MAGNETIC DISK APPARATUS AND DATA STORAGE METHOD

(75) Inventors: Hiroaki Inoue, Kawasaki (JP); Isao Suda, Higashine (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/395,672

(22) Filed: Mar. 1, 2009

(65) Prior Publication Data

US 2009/0219642 A1 Sep. 3, 2009

(30) Foreign Application Priority Data

Feb. 28, 2008 (JP) .................. 2008-047986

(51) Int. Cl.
*G11B 19/04* (2006.01)
*G11B 27/36* (2006.01)
*G11B 5/09* (2006.01)
*G11B 5/02* (2006.01)

(52) U.S. Cl. ............. 360/60; 360/31; 360/55; 360/47

(58) Field of Classification Search .............. None
See application file for complete search history.

(56) References Cited

U.S. PATENT DOCUMENTS

| | | | |
|---|---|---|---|
| 7,463,441 B2 * | 12/2008 | Cho et al. .................. | 360/60 |
| 2004/0193798 A1 * | 9/2004 | Kuwamura ................ | 711/114 |
| 2007/0211363 A1 | 9/2007 | Nagashima et al. | |
| 2008/0174905 A1 * | 7/2008 | Ueda ........................ | 360/77.04 |
| 2009/0244775 A1 * | 10/2009 | Ehrlich ..................... | 360/135 |

FOREIGN PATENT DOCUMENTS

JP 2007-242207 9/2007

* cited by examiner

*Primary Examiner* — Andrew L Sniezek
(74) *Attorney, Agent, or Firm* — Greer, Burns & Crain, Ltd.

(57) ABSTRACT

A magnetic disk apparatus that uses a head to write data in a plurality of unit areas arranged in an adjacent relationship to each other on a surface of a magnetic disk, and includes: a first recording section that records, in a RAM, the position of a unit area which is a target of data write; a first counting section that counts the number of times of data write operation performed for the unit area corresponding to the position recorded by the first recording section; and a second recording section that records, in a non-volatile storage medium different from the RAM, the side position which is the position of a unit area adjacent to the unit area whose number of records counted by the first counting section is more than a predetermined value.

10 Claims, 12 Drawing Sheets

MAGNETIC DISK APPARATUS AND DATA STORAGE METHOD

BACKGROUND OF THE INVENTION

1. Field of the Invention

The present invention relates to a technique for preventing a side erase in a magnetic disk apparatus.

2. Description of the Related Art

A magnetic disk apparatus is constituted by a magnetic head, a rotating magnetic disk, a motor for driving the magnetic head and magnetic disk, and a circuit for controlling the motor. Such a disk apparatus records information on the magnetic disk (magnetic medium) by magnetizing the surface of the magnetic disk using a magnetic field generated by the magnetic head.

In recent years, a small-sized magnetic head has been adopted in such a magnetic disk apparatus in order to achieve higher density information recording. As a result, tracks to be magnetized are arranged at high density on the magnetic disk.

Figure 13:
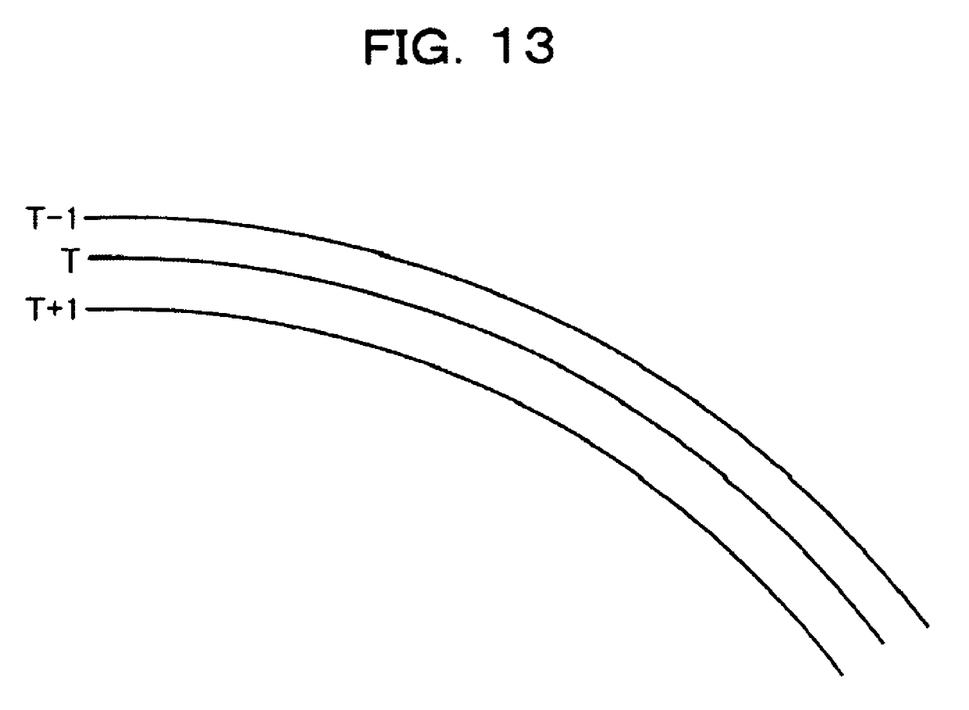
FIG. 13 is a view showing side erase tracks.

However, the higher density arrangement inevitably makes the distance between adjacent tracks smaller. This causes a side erase phenomenon in which the magnetic information of tracks (tracks T+1 and T−1 in FIG. 13) on both sides of a write target track (track T in FIG. 13) become weak by a leak magnetic field from the magnetic head. For example, in the case where data has been written to a given track a number of times and where no data has been written to tracks on both sides of the given track, the magnetic information of the tracks on both sides become weak to such a degree that it cannot be read out correctly, resulting in loss of information.

To cope with such a problem, there is known a technique that counts the number of times of data write operation for track. Further, there is known a technique that reads track data that is likely to be erased by the side erase phenomenon and writes the read out data to the same track (refer to, e.g., Patent Document 1: Jpn. Pat. Appln. Laid-Open Publication No. 2007-242207).

SUMMARY OF THE INVENTION

However, the abovementioned conventional technique of counting the number of times of data write operation for track is required to count the number of times of data write operation for all the tracks whose number is as large as 300,000 to 400,000 and is therefore impractical in terms of memory capacity and processing time. As a technique for coping with the above problem, there is known one that combining a plurality of tracks by a predetermined unit and counting the number of times of data write operation for each predetermined unit. However, this technique cannot accurately detect a side-erase track, involving unnecessary rewrite processing.

Further, the abovementioned technique that reads track data that is likely to be erased by the side erase phenomenon and writes the read out data to the same track has the following problem. That is, when a power supply is cut off for some reason during data write operation, data is imperfectly written into a sector for which the write operation is being performed due to interruption of the write operation, which makes it impossible to read out the data in the sector.

An object of the present invention is to provide a magnetic disk apparatus and a data storage method capable of detecting a side-erase track while suppressing a memory capacity to be used.

To solve the above problem, according to an aspect of the present invention, there is provided a magnetic disk apparatus that uses a head to write data in a plurality of unit areas arranged in an adjacent relationship to each other on a surface of a magnetic disk, including: a first recording section that records, in a memory, the position of a unit area which is a target of data write; a first counting section that counts the number of times of data write operation performed for the unit area corresponding to the position recorded by the first recording section; and a second recording section that records, in a non-volatile storage medium different from the memory, the side position which is the position of a unit area adjacent to the unit area whose number of records counted by the first counting section is more than a predetermined value.

Further, according to another aspect of the present invention, there is provided a data storage method that uses a head to write data in a plurality of unit areas arranged in an adjacent relationship to each other on a surface of a magnetic disk, including: a first recording step that records, in a memory, the position of a unit area which is a target of data write; a first counting step that counts the number of times of data write operation performed for the unit area corresponding to the position recorded by the first recording step; and a second recording step that records, in a non-volatile storage medium different from the memory, the side position which is the position of a unit area adjacent to the unit area whose number of records counted by the first counting step is more than a predetermined value.

According to the present invention, it is possible to detect a side-erase track while suppressing a memory capacity to be used.

DETAILED DESCRIPTION OF THE PREFERRED EMBODIMENTS

An embodiment of the present invention will be described below with reference to the accompanying drawings.

Figure 1:
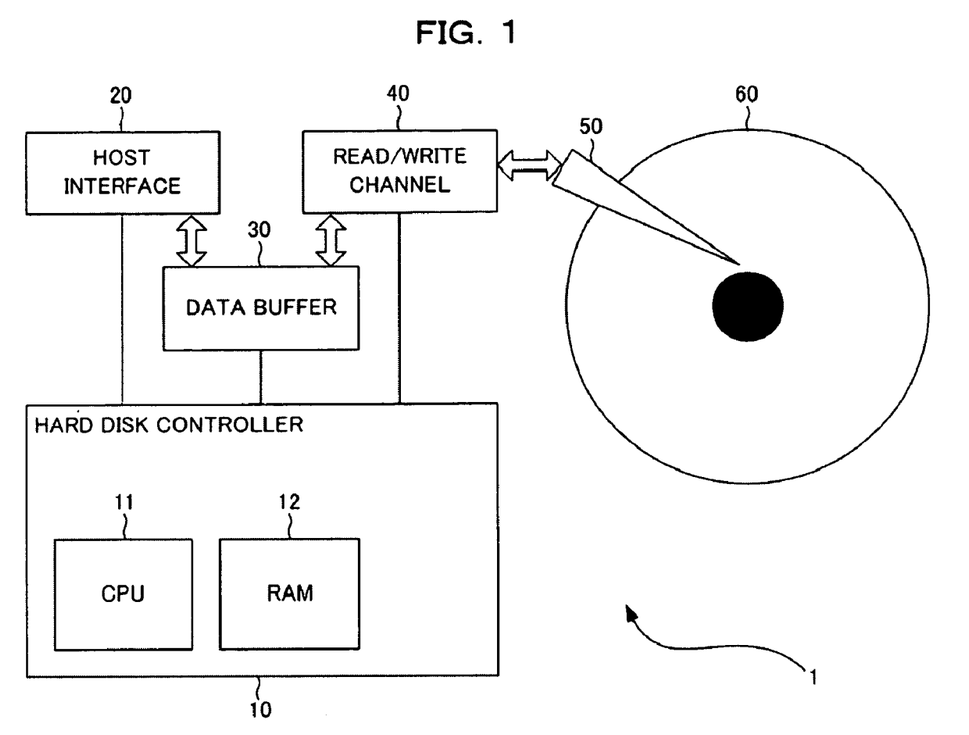
FIG. 1 is a view showing a configuration of a magnetic disk apparatus.

A configuration of a magnetic disk apparatus according to the present embodiment will firstly be described. FIG. 1 is a view showing a configuration of the magnetic disk apparatus.

A magnetic disk apparatus 1 according to the present embodiment includes a hard disk controller 10, a host interface 20, a data buffer 30, a read/write channel 40, a head 50 (first recording section, second recording section, rewriting section, data migration section), and a magnetic disk 60. The hard disk controller 10, which controls the magnetic disk apparatus 1, has a CPU 11 (first counting section, second counting section, first recording section, second recording section, rewriting section, data migration section) and a RAM 12 (memory). The host interface 20 is an interface for inputting/outputting data or a write request from/to a host (personal computer, etc.) connected to the magnetic disk apparatus 1. The data buffer 30 temporarily stores data in the course of read/write operation performed in the magnetic disk apparatus 1. The read/write channel 40 performs signal processing of code-modulating data to be written onto the magnetic disk 60 so as to output it to the head 50 and detecting data from a signal output from the head 50 so as to code-demodulate it. The head 50 performs data read/write operation for the magnetic disk 60. The magnetic disk 60 is a storage medium for recoding data there onto by means of a magnetic field generated by the head 50. The head 50 is constituted by a plurality of heads corresponding to a plurality of disks constituting the magnetic disk 60.

Figure 2:
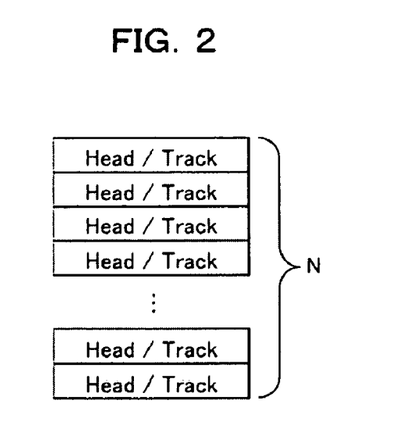
FIG. 2 is a view showing a primary table.
Figure 3:
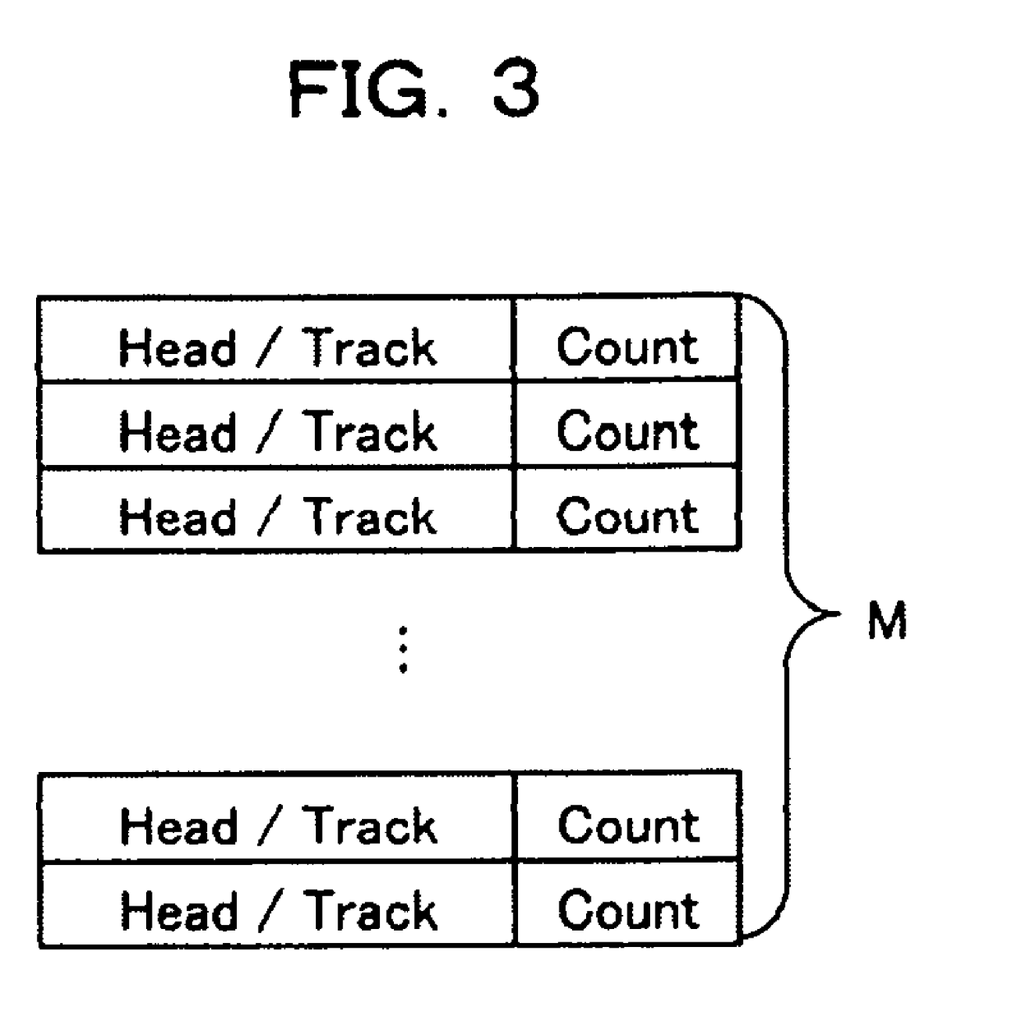
FIG. 3 is a view showing a secondary table.

A primary table (first recording section) and a secondary table (second recording section) will next be described. FIG. 2 is a view showing a primary table. FIG. 3 is a view showing a secondary table.

The primary table shown in FIG. 2, which is a table stored in the RAM 12, records a head number (Head) indicating one of the heads constituting the head 50 and a track number (Track) indicating one of the tracks constituting the magnetic disk 60. A combination of the Head and Track indicates one of the disks constituting the magnetic disk 60 and a track (position of a unit area) on the identified disk, thereby indicating a write position. Further, the Head/Track indicates a Head/Track for which data write operation is performed when a write request is received from the host through the interface 20 and the write request data is written onto the magnetic disk 60 using the head 50. The Head/Track is recorded up to a specified number (N) of times. When the number of records of the Head/Track reaches N, the CPU 11 counts the number of records of the Head/Track to calculate the number of times of write operation for each Head/Track and then initializes the primary table. This configuration prevents memory resources from being consumed excessively by the recording of the Head/Track.

The secondary table shown in FIG. 3 is stored in the magnetic disk 60 (non-volatile recording medium different from the memory). As in the case of the primary table, the secondary table identifies a track position on the magnetic disk 60 by a combination of the Head/Track. A count value (Count) added every time the same Head/track as one that has already been recorded is recorded in association with the Head/Track. Further, in the secondary table, the Head/Track is recorded up to a specified number (M) of times. The Head/Track recorded in the secondary table indicates the Head/track (side position) on both sides of the Head/track that has been recoded not less than a specified number (X) of times in the primary table. Further, in the secondary table, the Head/Track whose count value is not less than Y is assumed to be a Head/Track requiring rewrite processing. The secondary table may be recorded in an auxiliary storage apparatus (non-volatile recording medium different from the memory), such as a flash memory, other than the magnetic disk 60.

Figure 4:
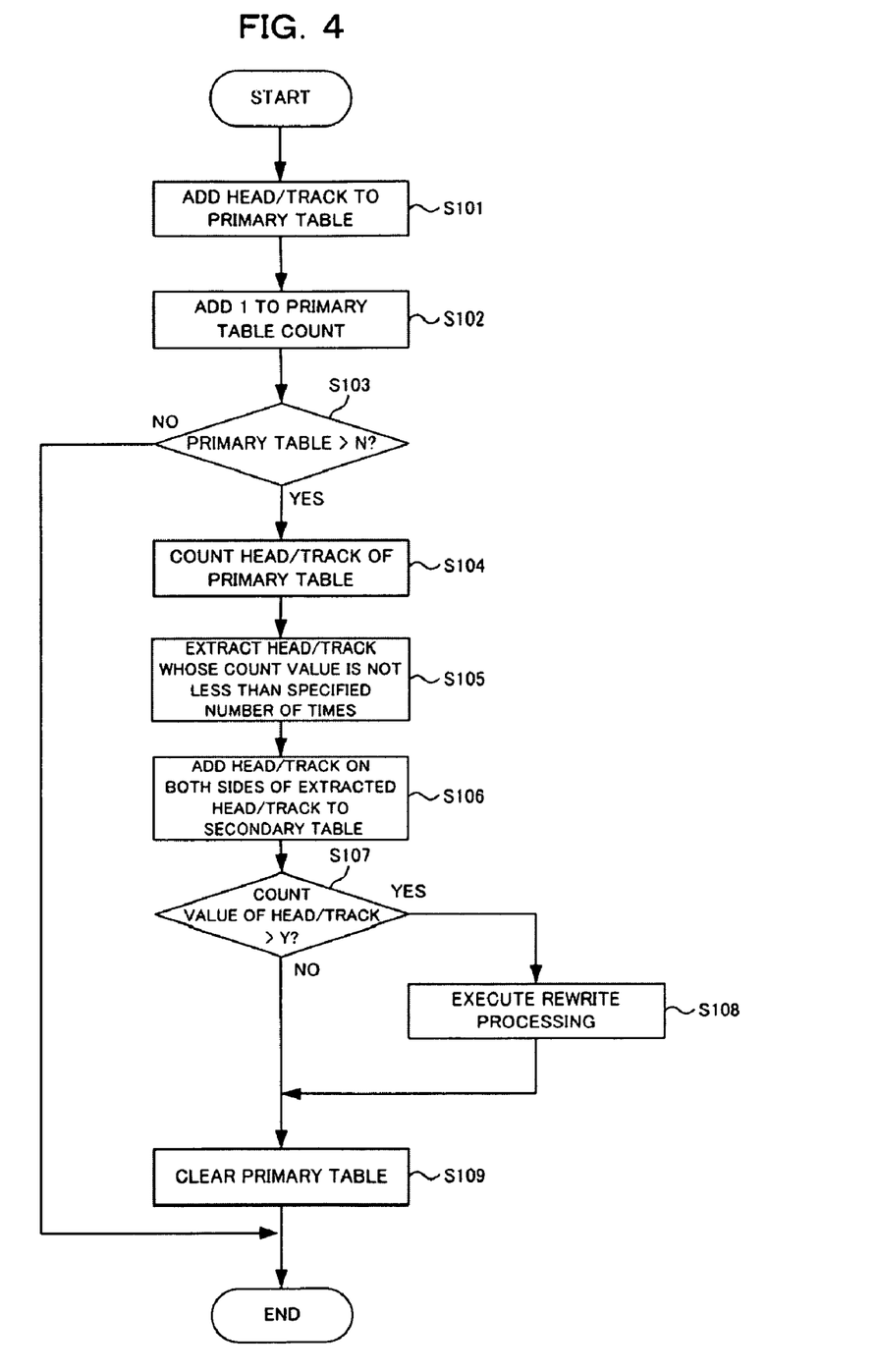
FIG. 4 is a flowchart showing operation of side erase track detection processing.

Operation of the magnetic disk apparatus according to the present embodiment will next be described. FIG. 4 is a flowchart showing operation of side erase track detection processing. It is assumed that the magnetic disk apparatus has received a write request from a host in FIG. 4.

The CPU 11 adds a Head/Track to which data is to be written to the primary table on the RAM 12 (S101, first recording step), adds 1 to the number of records in the primary table (S102, first counting step), and determines whether the number of records in the primary table is less than the specified number (N) of times (S103).

When the number of records of the Head/Track in the primary table is larger than N (YES in S103), the CPU 11 counts the number of records of the Head/Track in the primary table (S104, second recording step), extracts the Head/Track whose count value is not less than the specified number (X) of times (S105, second recording step), allows the head 50 to add the Head/Track on both sides of the extracted Head/Track to the secondary table (S106, second recording step), and determines whether the count value of the added Head/Track is larger than the specified number (Y) of times (S107).

In the case where the count value of the added Head/Track is not more than Y (NO in S107), the CPU 11 clears the primary table stored in the RAM 12 (S109) and ends the side erase track detection processing.

On the other hand, in the case where the count value of the added Head/Track is larger than Y (YES in S107), the CPU 11 executes rewrite processing (to be described later) for the added Head/Track (S108, rewrite step), clears the primary table stored in the RAM 12 (S109), and ends the side erase track detection processing.

In the case where the number of records in the primary table is not more than N in step S103 (NO in S103), the CPU 11 ends the side erase track detection processing.

As described above, the CPU 11 records the Head/Track to which data has been written in the RAM 12, counts the number of records of the Head/Track to calculate the number of times of write operation for each Head/Track at the time point when the number of records of the Head/Track in the RAM 12 exceeds N, and adds the Head/Track on both sides of the Head/Track whose count value is not less than X to the secondary table stored in the magnetic disk 60. With this configuration, it is possible to detect a track to which a large number of write operations have been performed while suppressing consumption of memory in the RAM 12 to thereby detect side-erase tracks on both sides of the rack to which a large number of write operations have been performed.

Figure 5:
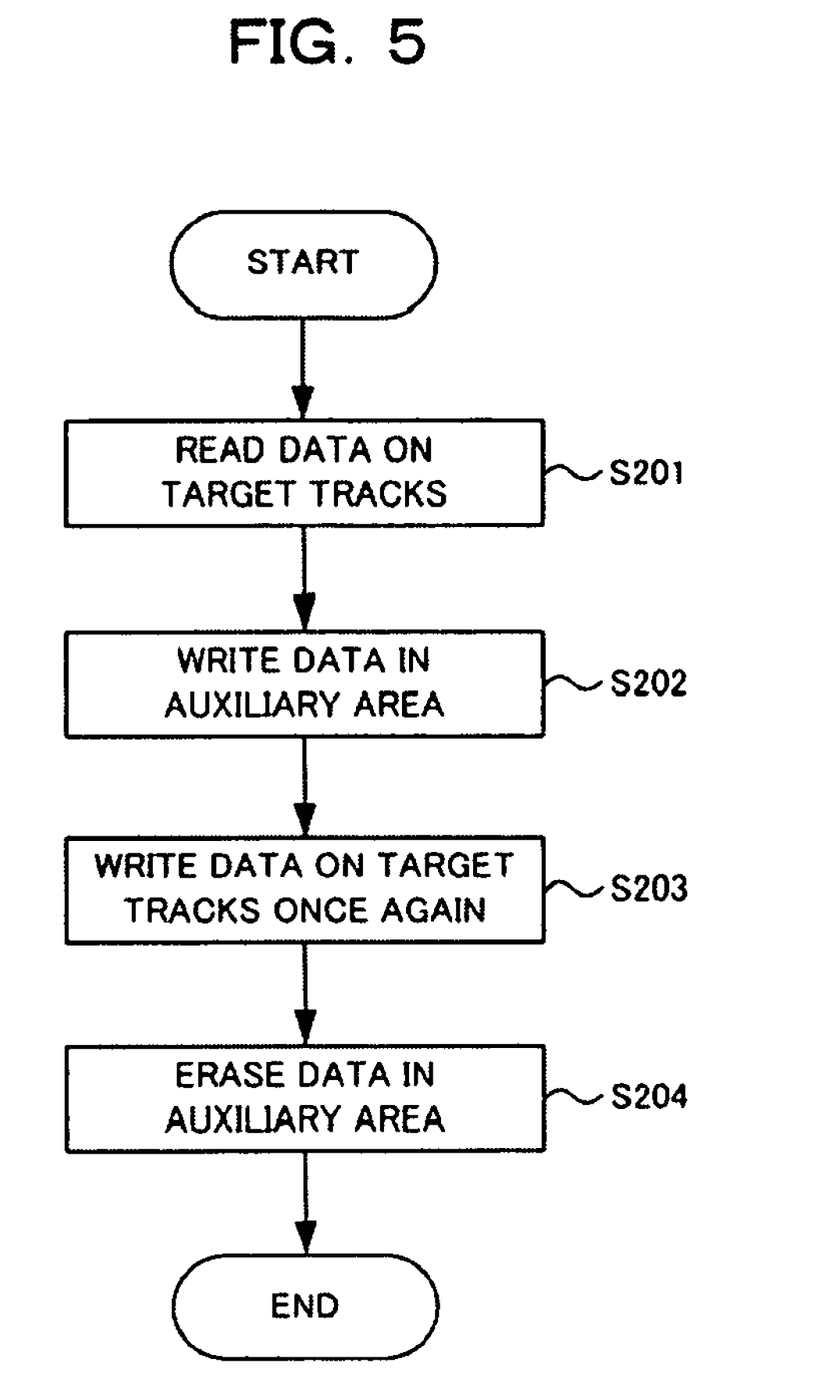
FIG. 5 is a flowchart showing operation of rewrite processing.

The rewrite processing will next be described. FIG. 5 is a flowchart showing operation of the rewrite processing. This processing corresponds to the processing of step S108 in the side erase detection processing. The rewrite processing is executed in the case where the magnetic disk apparatus is busy.

The CPU 11 instructs the read/write channel 40 to allow the head 50 to read data on target tracks which are Head/Track on both sides of the Head/Track whose count value is larger than the specified number (Y) of times (S201, rewrite step), allows the head 50 to write the data read out from the target tracks in an auxiliary area (first position) provided on the magnetic disk 60 (S202, rewrite step) as well as on the target tracks once again (S203, rewrite step), allows the head 50 to erase the data in the auxiliary area (S204), and ends the rewrite processing.

As described above, the data on the target tracks is written in the auxiliary area before the rewrite processing, so that even if the rewrite processing is interrupted due to cutoff of a power supply, it is possible to prevent data to be rewritten from being lost. Further, since the rewrite processing is executed while the magnetic disk apparatus 1 is busy, that is, before notification of the end of a write command issued from the host, it is possible to reduce a possibility that a power supply is cut off during the rewrite processing.

The auxiliary area is provided on the magnetic disk 60 for temporarily storing the data to be rewritten. The auxiliary area need not necessarily be provided on the magnetic disk 60, but may be provided in a flash memory used together with the magnetic disk apparatus 1 for the host or on a magnetic disk other than the magnetic disk 60.

Figure 6:
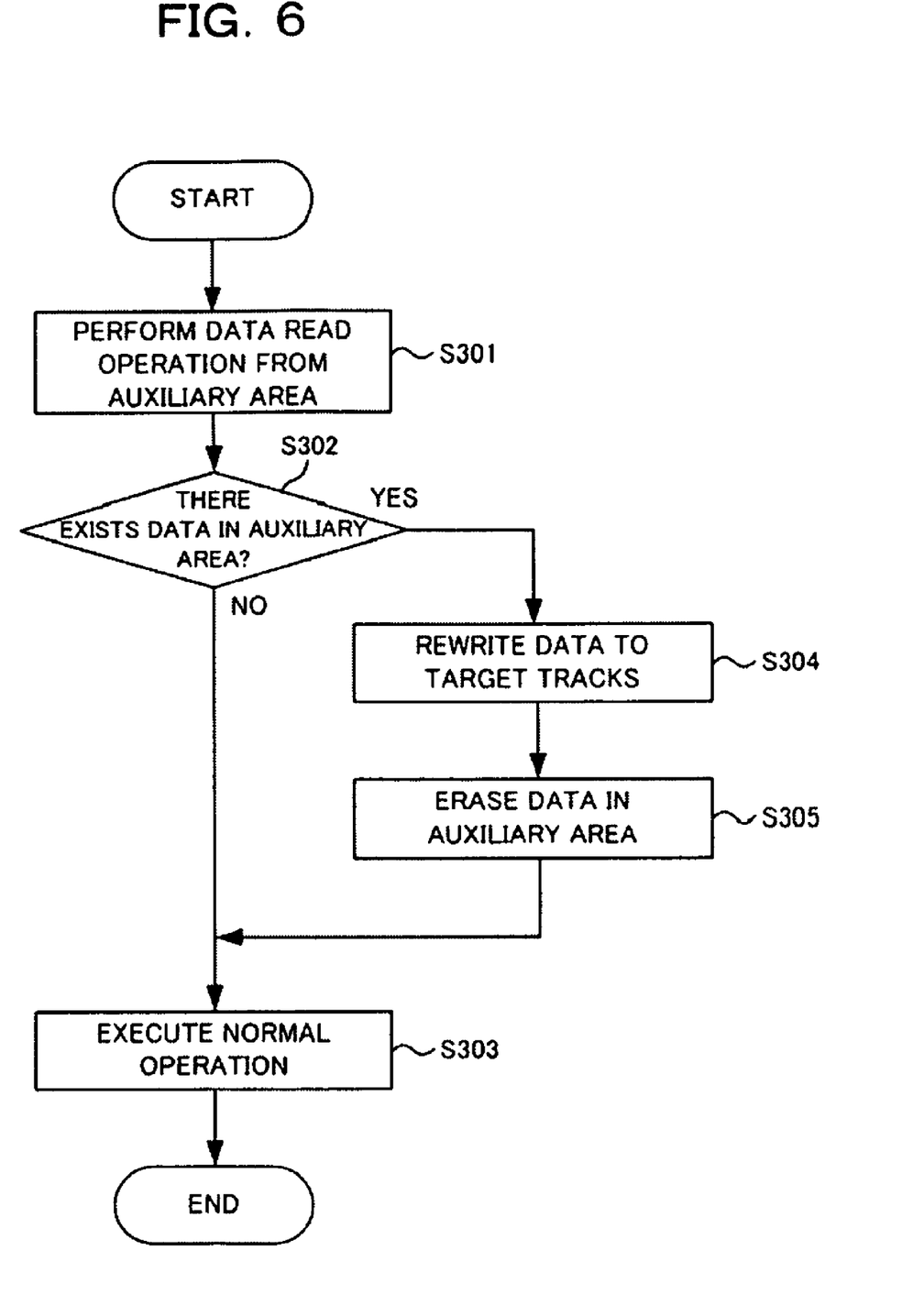
FIG. 6 is a flowchart showing operation of auxiliary area check processing.

Auxiliary area check processing will next be described. This processing checks whether there exists data in the auxiliary area in case that the rewrite processing is interrupted. FIG. 6 is a flowchart showing operation of the auxiliary area check processing.

When a power supply of the magnetic disk apparatus 1 is turned on, the CPU 11 allows the head 50 to perform data read operation from the auxiliary area (S301) to determine whether there exists data in the auxiliary area (S302).

In the case where there is no data in the auxiliary area (NO in S302), the CPU 11 executes a normal activation process (S303).

On the other hand, in the case where there exists data in the auxiliary area (YES in S302), the CPU 11 allows the head 50 to write the data read out from the auxiliary area to target tracks (S304) as well as to erase the data in the auxiliary area (S305), and then executes a normal activation process (S303).

In the case where there exists data in the auxiliary area as described above, that is, in the case where the rewrite processing has not been completed normally for some reason, the data is rewritten to target tracks to thereby restore the data to the target tracks.

Figure 7:
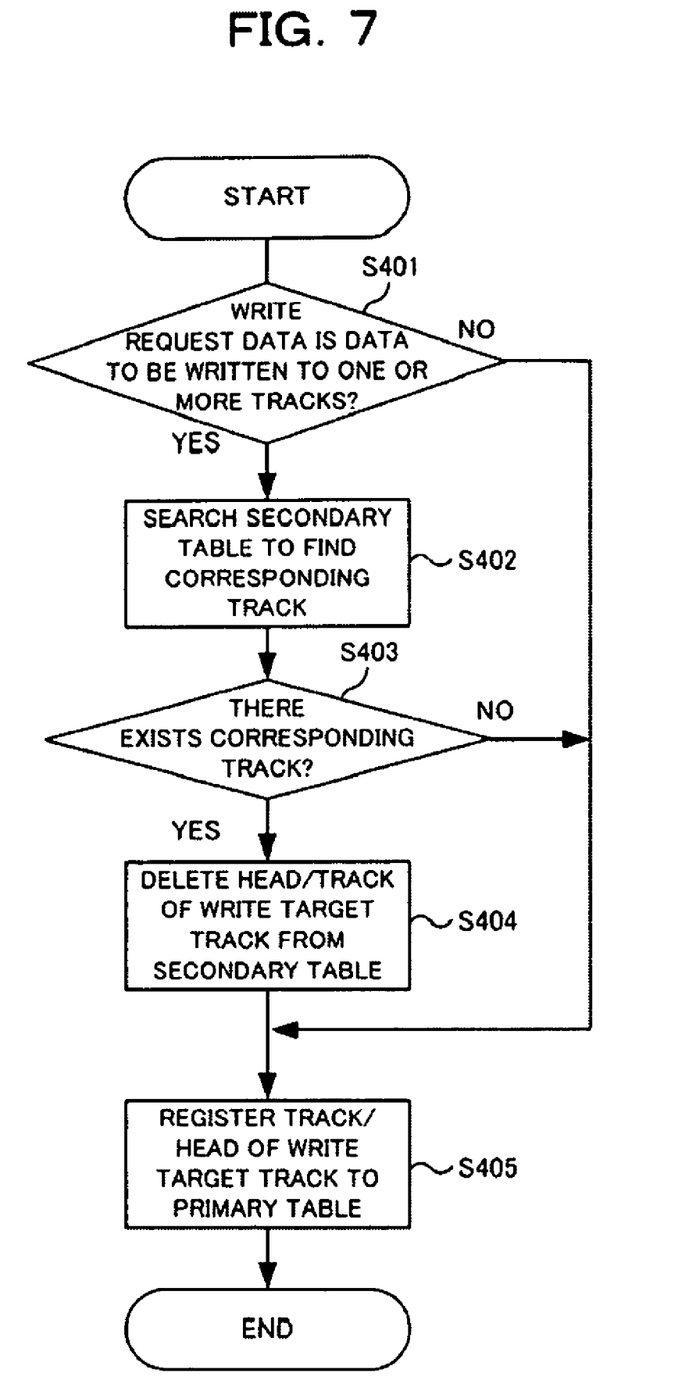
FIG. 7 is a flowchart showing operation of secondary table deletion processing.

Secondary table deletion processing will next be described. This processing is executed in the case where data is written to the Track/Head recorded in the secondary table. FIG. 7 is a flowchart showing operation of the secondary table deletion processing. It is assumed that a write command has been issued in FIG. 7.

The CPU 11 determines whether write request data is data to be written to one or more tracks (S401).

In the case where write request data is data to be written to one or more tracks (YES in S401), the CPU 11 searches the secondary table using Head/Track of a write target track over the entire area of which the write request data is written as a key (S402) to determine there exists a track having Head/Track corresponding to the write target track (S403).

In the case where there exists a track corresponding to the Head/Track of the write target track (YES in S403), the CPU 11 deletes the Head/Track of the write target track from the secondary table (S404) and registers the Head/Track of the write target track to the primary table (S405).

On the other hand, in the case where there exists no track corresponding to the Head/Track of the write target track (NO in S403), the CPU 11 registers the Head/Track of the write target track to the primary table (S405).

In the case where the amount of the write request data is less than that corresponding to one track (NO in S401), the CPU 11 registers the Head/Track of the write target track to the primary table (S405).

As described above, in the case where data is written to the Head/Track recorded in the secondary table, the recording information of the write target track is consolidated, so that the Head/Track of the write target track is deleted from the secondary table. With this operation, it is possible to delete, from the secondary table, not only the Head/Track of the track to which data has been rewritten by the rewrite processing but also the Head/Track of the track to which data is written in normal operation, with the result that tracks that is less subject to side erase can be deleted from the secondary table.

Figure 8:
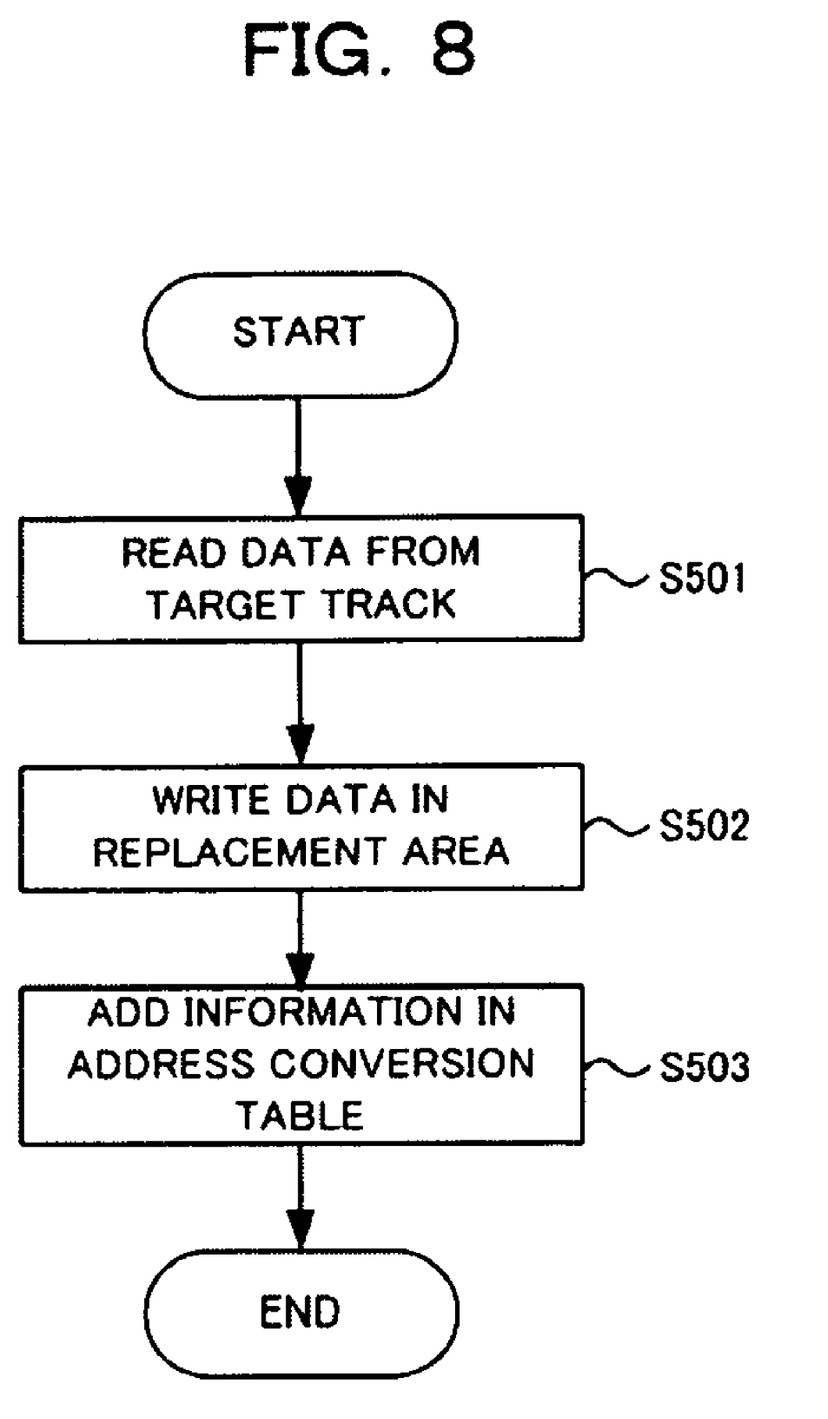
FIG. 8 is a flowchart showing operation of data replacement processing.
Figure 9:
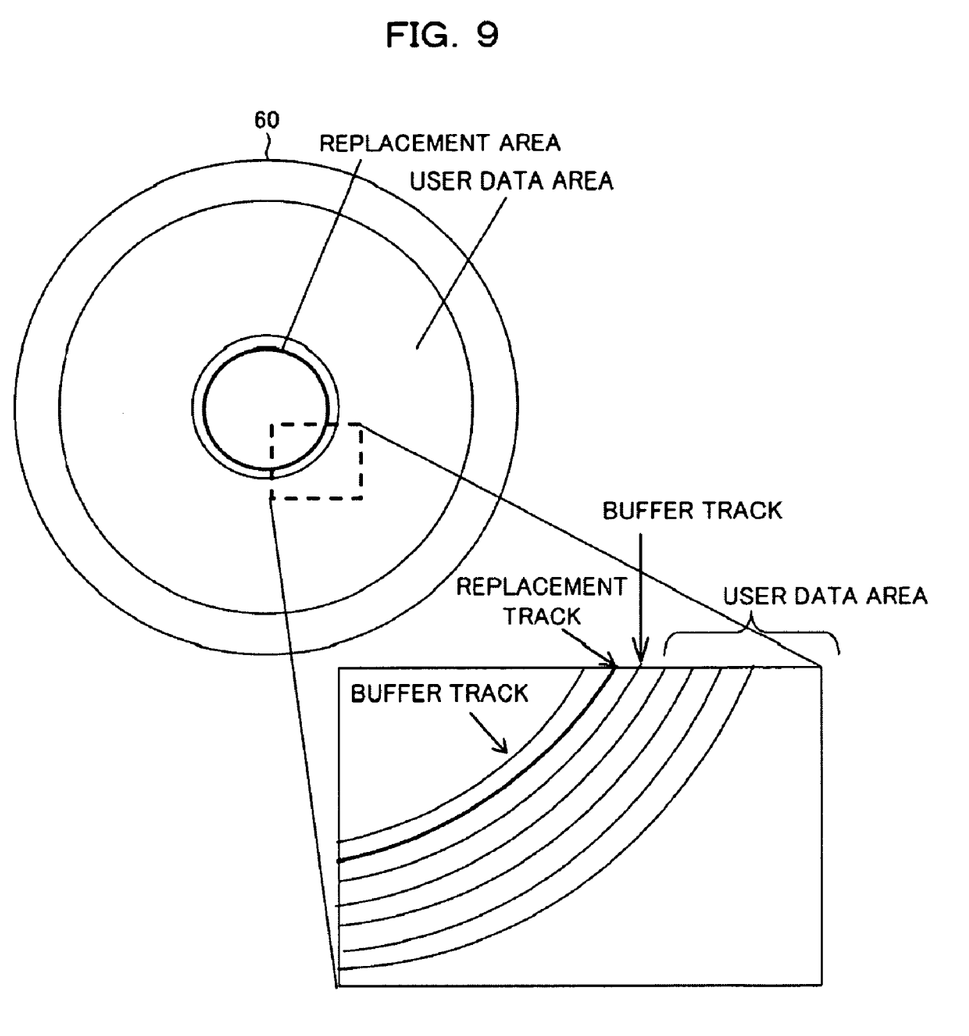
FIG. 9 is a view showing a replacement area on a magnetic disk.

Data replacement processing will next be described. This processing is executed for a track to which data that is frequently updated, such as OS setting information, is written. Such a track is frequently subjected to data write operation, so that it is highly likely that data loss occurs in tracks on both sides thereof. Such a track that is frequently subjected to data write operation is assumed to be detected from the secondary table. Further, in order to detect a track that is frequently subjected to data write operation, a table for recording a track for which data write operation has been performed more than a predetermined number of times may be stored in the magnetic disk 60. FIG. 8 is a flowchart showing operation of the data replacement processing. FIG. 9 is a view showing a replacement area on the magnetic disk.

The CPU 11 allows the head 50 to read data from a track that is a target track frequently subjected to data write operation (S501, data migration step) and to write the read data in the replacement area (second position) on the magnetic disk 60 (S502, data migration step). Here, the replacement area will be described. As shown in FIG. 9, the replacement area is provided on a specific area on the magnetic disk 60 and includes a plurality of replacement tracks. Formed on both sides of the replacement track are buffer tracks to which data cannot be written.

Then, in order to identify the position of the track that has been subjected to the replacement processing, the CPU 11 adds, to an address conversion table for converting a logical sector address (LBA) into the physical position, information indicating that data write position has been changed (S503).

As described above, data on the track that is frequently subjected to data write operation is migrated to the replacement track on both sides of which the buffer tracks are provided. In this case, data has not been written in the buffer tracks, so that side erase phenomenon does not occur. Further, the buffer track need not necessarily be a track to which data has not been written. For example, data may be recorded in an area in which data that need not be recorded has been written at an interval corresponding to one track.

Figure 10:
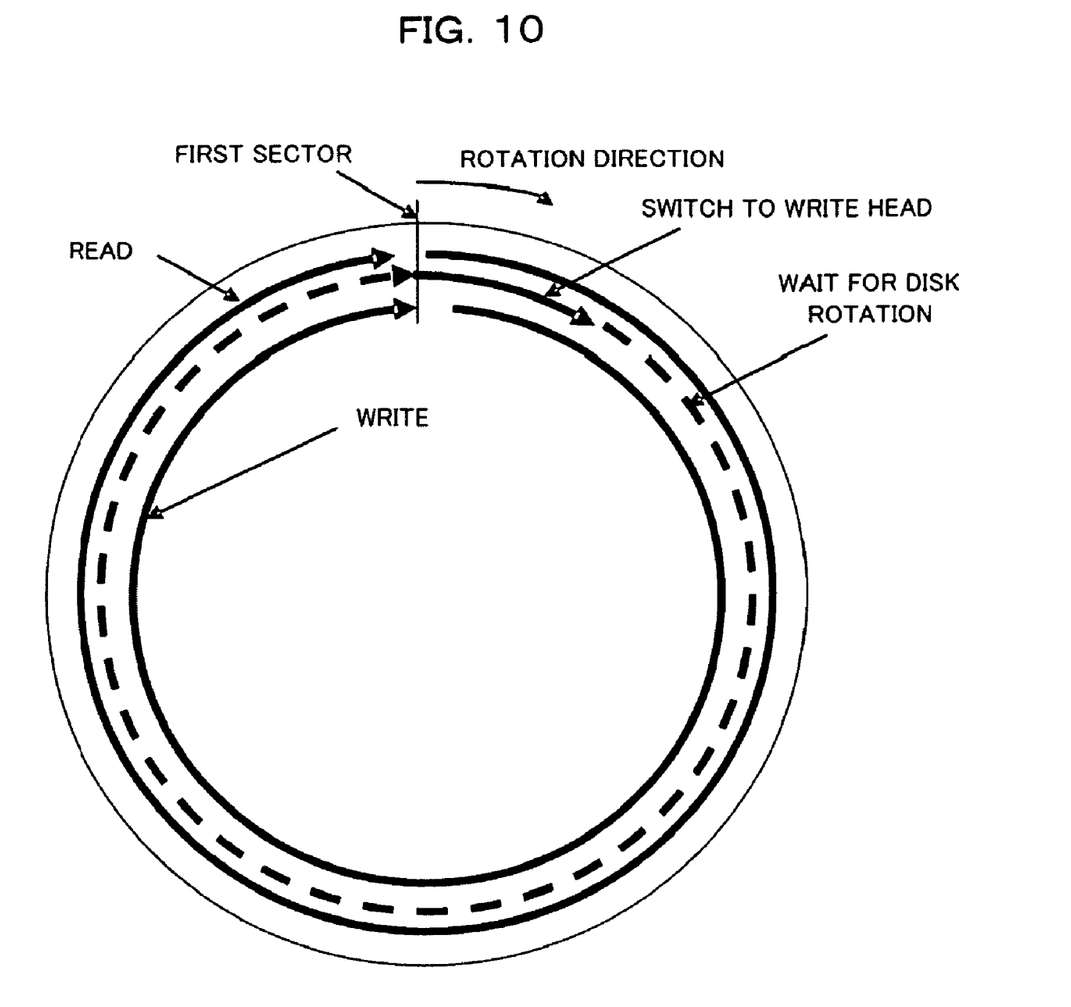
FIG. 10 is a view showing a conventional data rewrite method.
Figure 11:
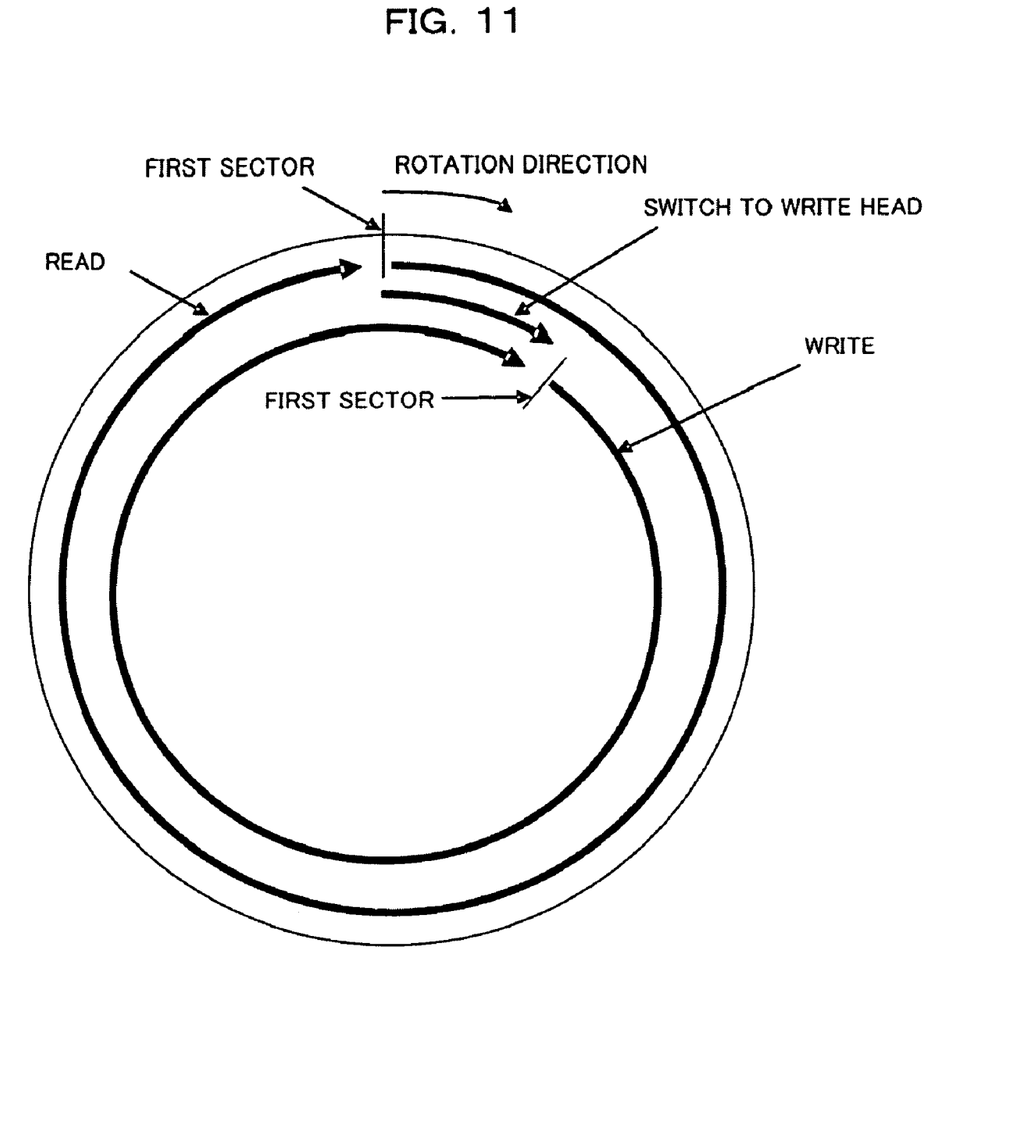
FIG. 11 is a view showing a data rewrite method according to the present embodiment.
Figure 12:
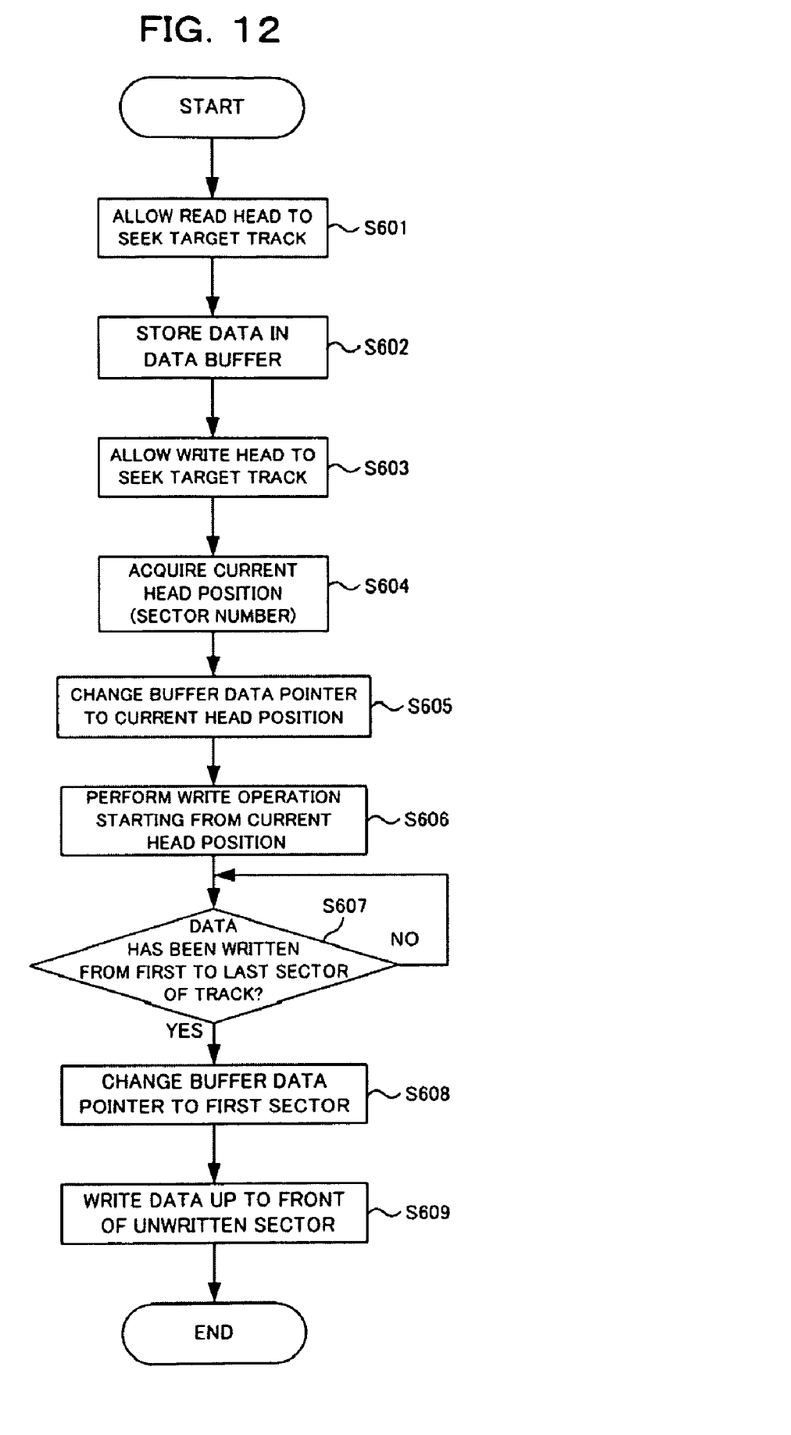
FIG. 12 is a flowchart showing operation of data write processing for auxiliary area.

A method of writing data in the auxiliary area according to the present embodiment will next be described. FIG. 10 is a view showing a conventional data write method. FIG. 11 is a view showing the method of writing data in the auxiliary area according to the present embodiment. FIG. 12 is a flowchart showing operation of the auxiliary area write processing. Now, the method of writing data in the auxiliary area according to the present embodiment will be described.

As shown in FIG. 10, in the conventional write method, the first sector serving as the write start position on the magnetic disk 60 is previously determined. Concretely, the method including reading data on a track to which rewrite processing is performed, switching the head 50 to the write head, waiting for disk rotation until the first sector reaches the head position, and writing the read data after the first sector reaches the head position. However, in this method, it is necessary to wait for disk rotation until the first sector reaches the head position, correspondingly taking unnecessary time to complete the rewrite processing.

In the present embodiment, as shown in FIG. 11, the first sector is not fixed but the position at which the head 50 is switched to the write head is set as the first sector. This makes it possible to perform data write operation for the auxiliary area without waiting for the disk rotation. In the following, with reference to FIG. 12, the auxiliary area write processing using the method of writing data in the auxiliary area will be described.

The CPU 11 switches the head 50 to the read head and allows the read head to seek a target track for which the rewrite processing is performed (S601) and to read data on the target track and stores the data read by the read head in the data buffer 30 through the read/write channel 30 (S602).

Then, the CPU 11 switches the head 50 to the write head and allows the write head to seek a target track to which the read data is to be written (S603), acquires the sector number as the head position of the position at which the target track is sought (S604), changes the buffer data pointer to the acquired sector number (S605), and allows the write head to perform write operation with the acquired sector number set as the first sector (S606).

After allowing the head 50 to start write operation, the CPU 11 determines whether data has been written up to the last sector of the track for which the head 50 performs write operation (S607).

When determining that data has been written up to the last sector of the track for which the head 50 performs write operation (YES in S607), the CPU 11 changes the buffer data pointer to the original fixed first sector (S608), allows the head 50 to write data up to the front of unwritten sector (S609), and ends the processing.

On the other hand, when determining that data has not been written up to the last sector of the track for which the head 50 performs write operation (NO in S607), the CPU 11 determines once again whether data has been written up to the last sector of the track for which the head 50 performs write operation (S607).

As described above, by setting the position at which the head is switched to the write head as the first sector, it is possible to eliminate the need to wait for the rotation of the magnetic disk 60 in the write processing for the auxiliary area, thereby reducing the time needed to complete the data write operation for the auxiliary area.

Although the recording of the number of times of write operation and rewrite processing which is based on the number of times of write operation are performed in units of a track in the magnetic apparatus 1 according to the present embodiment, these operations may be performed in units of a sector.

The secondary table may register not only the both-side tracks but also Head/Track of adjacent tracks to the both side-tracks. In this case, side erase phenomenon can be detected in wider areas.

The embodiment of the present invention can detect not only data loss of adjacent tracks due to occurrence of the side erase phenomenon but also phenomenon in which the magnetic head is deviated from the proper track due to vibration or impact to cause data on adjacent tracks to gradually disappears or phenomenon in which information at adjacent positions gradually disappears physically or electrically.

What is claimed is:

1. A magnetic disk apparatus that uses a head to write data in a plurality of unit areas arranged in an adjacent relationship to each other on a surface of a magnetic disk, comprising:
    a first recording section that records, in a memory, the position of a unit area which is a target of data write;
    a first counting section that counts the number of times of data write operation performed for the unit area corresponding to the position recorded by the first recording section;
    a second recording section that records, in a non-volatile storage medium different from the memory, the side position which is the position of a unit area adjacent to the unit area whose number of records counted by the first counting section is more than a predetermined value;
    a second counting section that counts the number of records of the side position recorded by the second recording section; and
    a rewriting section that reads out data recorded on the side position in the case where the number of records of the side position counted by the second counting section is more than a predetermined value, writes the read out data in a first position which is the position of a unit area different from the side position, and writes the same read out data in the side position after the write operation for the first position.

2. The magnet disk apparatus according to claim 1, further comprising:
    a data migration section that counts the number of records of the position of the target unit area whose number of records counted by the first counting section is more than a predetermined value, reads out data recorded in one of the position of the side unit area and the position of the target unit area whose count value is more than the predetermined value, and writes the read out data in a second position which is the position of a replacement area different from the one of the position of the side unit area and the position of the target unit area from which the data is read out.

3. The magnetic disk apparatus according to claim 2, wherein data has not been written on both sides of the second position.

4. The magnetic disk apparatus according to claim 1, wherein the unit area is a track formed on the magnetic disk.

5. The magnetic disk apparatus according to claim 4, wherein the first position is a track previously provided for temporary data storage.

6. A data storage method that uses a head to write data in a plurality of unit areas arranged in an adjacent relationship to each other on a surface of a magnetic disk, comprising:
    a first recording step that records, in a memory, the position of a unit area which is a target of data write;
    a first counting step that counts the number of times of data write operation performed for the unit area corresponding to the position recorded by the first recording step; and
    a second recording step that records, in a non-volatile storage medium different from the memory, the side position which is the position of a unit area adjacent to the unit area whose number of records counted by the first counting step is more than a predetermined value;
    a second counting step that counts the number of records of the side position recorded by the second recording step; and
    a rewriting step that reads out data recorded on the side position in the case where the number of records of the side position counted by the second counting step is more than a predetermined value, writes the read out data in a first position which is the position of a unit area different from the side position, and writes the same read out data in the side position after the write operation for the first position.

7. The data storage method according to claim 6, further comprising:
    a data migration step that counts the number of records of position of the target unit area whose number of records counted by the first counting step is more than a predetermined value, reads out data recorded in one of the position of the side unit area and the position of the target unit area whose count value is more than the predetermined value, and writes the read out data in a second position which is the position of a replacement area different from the one of the position of the side unit area and the position of the target unit area from which the data is read out.

8. The data storage method according to claim 7, wherein data has not been written on both sides of the second position.

9. The data storage method according to claim 6, wherein the unit area is a track formed on the magnetic disk.

10. The data storage method according to claim 9, wherein the first position is a track previously provided for temporary data storage.

* * * * *